(12) United States Patent
Wendte et al.

(10) Patent No.: US 9,137,940 B2
(45) Date of Patent: Sep. 22, 2015

(54) GAUGE WHEEL ARRANGEMENT FOR A SEEDER ROW UNIT

(71) Applicant: CNH America LLC, New Holland, PA (US)

(72) Inventors: Keith W. Wendte, Willowbrook, IL (US); Monte G. Weller, Frankfort, IL (US)

(73) Assignee: CNH Industrial America LLC, New Holland, PA (US)

( * ) Notice: Subject to any disclaimer, the term of this patent is extended or adjusted under 35 U.S.C. 154(b) by 123 days.

(21) Appl. No.: 13/776,212

(22) Filed: Feb. 25, 2013

(65) Prior Publication Data

US 2014/0238283 A1    Aug. 28, 2014

(51) Int. Cl.
*A01C 5/06*    (2006.01)
*A01C 7/20*    (2006.01)

(52) U.S. Cl.
CPC ............... *A01C 5/064* (2013.01); *A01C 7/201* (2013.01); *A01C 7/203* (2013.01)

(58) Field of Classification Search
CPC .......... A01C 5/064; A01C 5/062; A01C 5/06; A01C 5/00; A01C 7/201; A01C 7/20; A01C 7/206; A01C 7/203
See application file for complete search history.

(56) References Cited

U.S. PATENT DOCUMENTS

| | | |
|---|---|---|
| 4,307,674 A | 12/1981 | Jennings et al. |
| 4,493,274 A | 1/1985 | Robinson, Jr. et al. |
| 4,590,869 A | 5/1986 | Steilen |
| 5,443,023 A | 8/1995 | Carroll |
| 5,724,902 A * | 3/1998 | Janelle et al. ............... 111/164 |
| 6,032,593 A | 3/2000 | Wendling et al. |
| 6,213,035 B1 | 4/2001 | Harrison |
| 6,321,667 B1 | 11/2001 | Shoup |
| 6,848,377 B2 | 2/2005 | Rylander et al. |
| 7,143,704 B1 | 12/2006 | Gust et al. |
| 7,322,302 B1 | 1/2008 | Reidhar |
| 7,360,495 B1 | 4/2008 | Martin |
| 7,669,536 B2 | 3/2010 | Martin |
| 7,784,416 B2 | 8/2010 | Thompson et al. |
| 7,980,186 B2 | 7/2011 | Henry |
| 8,069,798 B2 | 12/2011 | Martin |
| 2011/0036602 A1* | 2/2011 | Bassett ........................... 172/1 |
| 2012/0042812 A1 | 2/2012 | Martin |
| 2012/0067259 A1 | 3/2012 | Mariman et al. |
| 2012/0192774 A1 | 8/2012 | Hesla |

* cited by examiner

*Primary Examiner* — Christopher J Novosad
(74) *Attorney, Agent, or Firm* — Rebecca L. Henkel

(57) ABSTRACT

One row unit for an agricultural implement includes a ground engaging tool configured to penetrate soil and to form a furrow in the soil. The row unit also includes gauge wheels disposed adjacent to the ground engaging tool and configured to enable the ground engaging tool to penetrate the soil at a selectable penetration depth. Each of the gauge wheels extends substantially parallel to a direction of travel of the row unit.

6 Claims, 4 Drawing Sheets

GAUGE WHEEL ARRANGEMENT FOR A SEEDER ROW UNIT

BACKGROUND

The invention relates generally to ground working equipment, such as agricultural equipment, and more specifically, to a gauge wheel arrangement for a seeder row unit.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener assembly (e.g., an opener disc) that forms a seeding path for seed deposition into the soil. In certain configurations, a gauge wheel or wheels are positioned a vertical distance above the opener to establish a desired furrow depth for seed deposition into the soil. As the implement travels across a field, the opener excavates a furrow (e.g., trench) into the soil, and seeds are deposited into the furrow. In certain row units, the opener assembly is followed by a closing device such as a set of closing discs or wheels that direct the soil back into the furrow and/or a packer wheel that packs the soil on top of the deposited seeds.

In certain planting implements, the opener assembly includes multiple opener discs that penetrate the soil to form the furrow. Moreover, the opener discs rotate as the row unit travels across the field, thereby excavating the furrow. As a speed of the row unit increases, a speed of rotation of the opener discs also increases. Consequently, the opener discs may throw soil away from the furrow, thereby, making it difficult for the closing discs or wheels to direct the thrown soil back into the furrow to cover the seeds deposited in the furrow. Therefore, uneven seed covering may occur, resulting in non-optimal growing conditions for the seeds and, thereby, reducing overall crop yields and profits.

BRIEF DESCRIPTION

In one embodiment, a row unit for an agricultural implement includes a ground engaging tool configured to penetrate soil and to form a furrow in the soil. The row unit also includes gauge wheels disposed adjacent to the ground engaging tool and configured to enable the ground engaging tool to penetrate the soil at a selectable penetration depth. Each of the gauge wheels extends substantially parallel to a direction of travel of the row unit.

In another embodiment, a row unit for an agricultural implement includes a ground engaging tool having a pair of opener discs configured to penetrate soil and to form a furrow in the soil. Each opener disc includes a central portion and a peripheral portion, and the peripheral portions of the opener discs extend toward one another to form a V-shape. The row unit also includes a pair of gauge wheels configured to enable the opener discs to penetrate the soil at a selectable penetration depth. A front end of each gauge wheel is disposed behind the central portion of an adjacent opener disc relative to a direction of travel.

In a further embodiment, a row unit for an agricultural implement includes a pair of opener discs configured to penetrate soil and to form a furrow in the soil. Each opener disc includes a central portion and a peripheral portion, the peripheral portions of the opener discs extend toward one another to form a pinch point at a front end of the opener discs relative to a direction of travel of the row unit. The row unit also includes a pair of gauge wheels configured to enable the opener discs to penetrate the soil at a selectable penetration depth. The row unit further includes a seed tube disposed between the opener discs. The seed tube is configured to direct seeds into the furrow. The gauge wheels are disposed on opposite lateral sides of the opener discs. A front end of each gauge wheel is disposed behind the central portion of an adjacent opener disc relative to the direction of travel.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
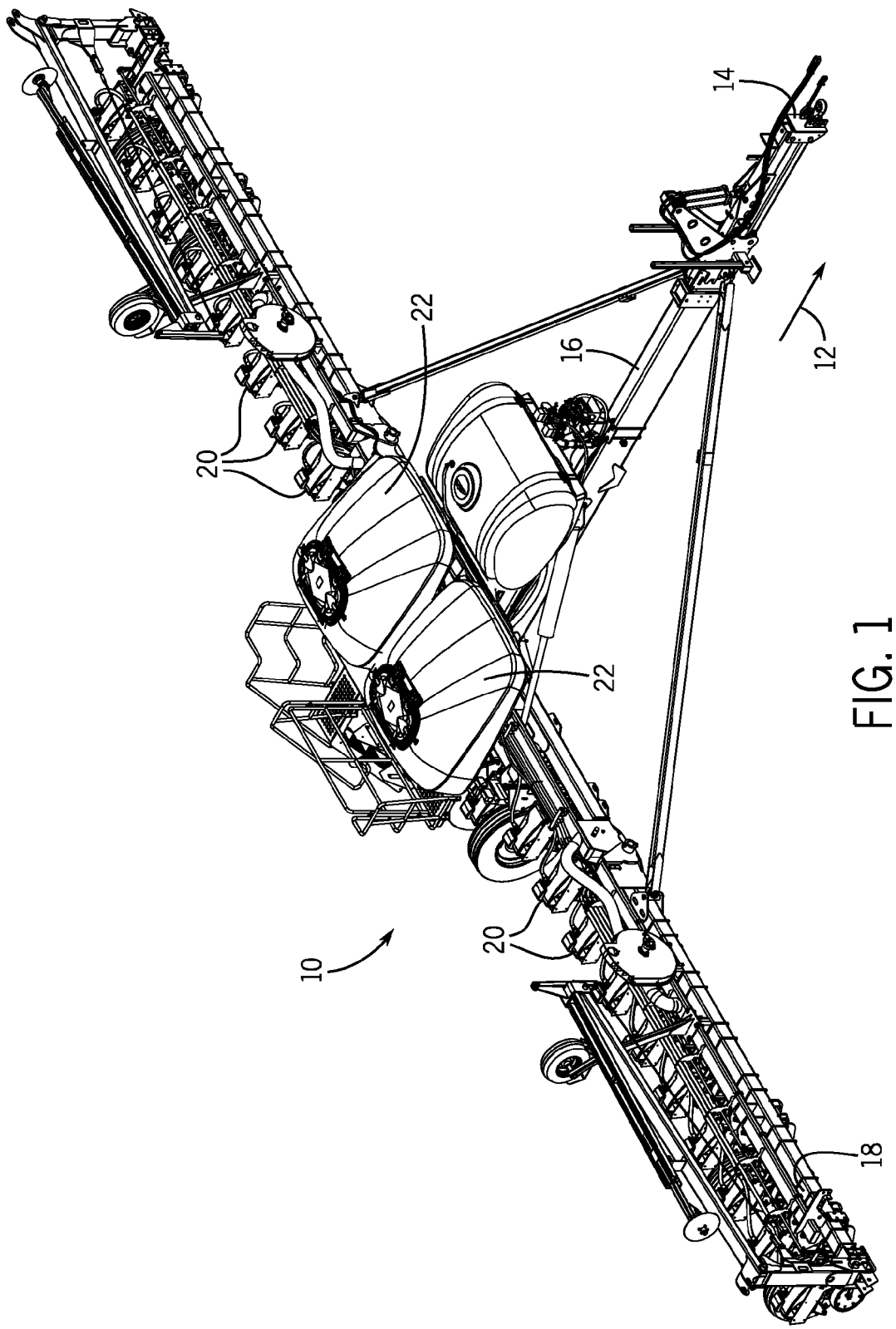
FIG. 1 is a perspective view of an embodiment of an agricultural implement configured to deposit seeds into a soil surface.

FIG. 1 is a perspective view of an embodiment of an agricultural implement 10 configured to deposit seeds into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit seeds at a desired depth beneath the soil surface, thereby establishing rows of planted seeds. The implement 10 also includes seed tanks 22, and a pneumatic distribution system configured to convey seeds from the tanks to the row units 20. In certain embodiments, the pneumatic distribution system includes an inductor box positioned beneath each seed tank 22. Each inductor box is configured to receive seeds from a respective tank, to fluidize the seeds into an air/seed mixture, and to distribute the air/seed mixture to the row units 20 via a network of pneumatic hoses/conduits.

In certain embodiments, each row unit 20 includes a row unit attachment, an opening assembly, a seed tube, a closing assembly, and a press wheel. The row unit attachment may include a rotating wheel having multiple tillage points or fingers that break up or remove crop residue, thereby preparing the soil for seed deposition. Moreover, the row unit attachment may include a pair of discs used to clear a path of material such as dirt clods or rocks. The opening assembly includes one or more gauge wheels and one or more opener discs. The gauge wheel may be positioned a vertical distance above the opener disc to establish a desired furrow depth for seed deposition into the soil. The closing assembly includes a pair of closing discs or wheels. As the row unit travels across a field, the opener disc excavates a furrow into the soil for seed deposition. The seed tube, which may be positioned behind the opening assembly, directs a seed from a metering system into the excavated furrow. The closing discs or wheels then direct the excavated soil into the furrow to cover the planted seed. Finally, the press wheel packs the soil on top of the seed with a desired pressure.

While the illustrated implement 10 includes 24 row units 20, it should be appreciated that alternative implements may include more or fewer row units 20. For example, certain implements 10 may include between 4, 6, 8, 12, 16, 24, 32, 36, or 54 row units, or more. In addition, the spacing between row units 20 may be particularly selected based on the type of crop being planted. For example, the row units 20 may be spaced 30 inches from one another for planting corn, and 15 inches from one another for planting soy beans.

In certain embodiments, the gauge wheels may be positioned adjacent to the opener discs such that the gauge wheels are substantially parallel to the direction of travel 12 of the row units 20. Such a position may decrease a draft load caused by the gauge wheels contacting the soil. Moreover, such a position may also direct a substantial amount of soil toward the furrows formed by the opener discs, may provide a greater gap between the opener discs for placement of a seed tube, and may facilitate formation of a narrower furrow, as compared to opener assemblies that have gauge wheels that are not substantially parallel to the direction of travel 12. In other embodiments, the gauge wheels may be positioned adjacent to a rear portion of the opener discs relative to the direction of travel 12 of the row units 20. Accordingly, the gauge wheels may function as closing discs and may direct soil into the furrows. In such row units 20, closing discs may be obviated, thereby decreasing costs associated with manufacturing the row units 20.

Figure 2:
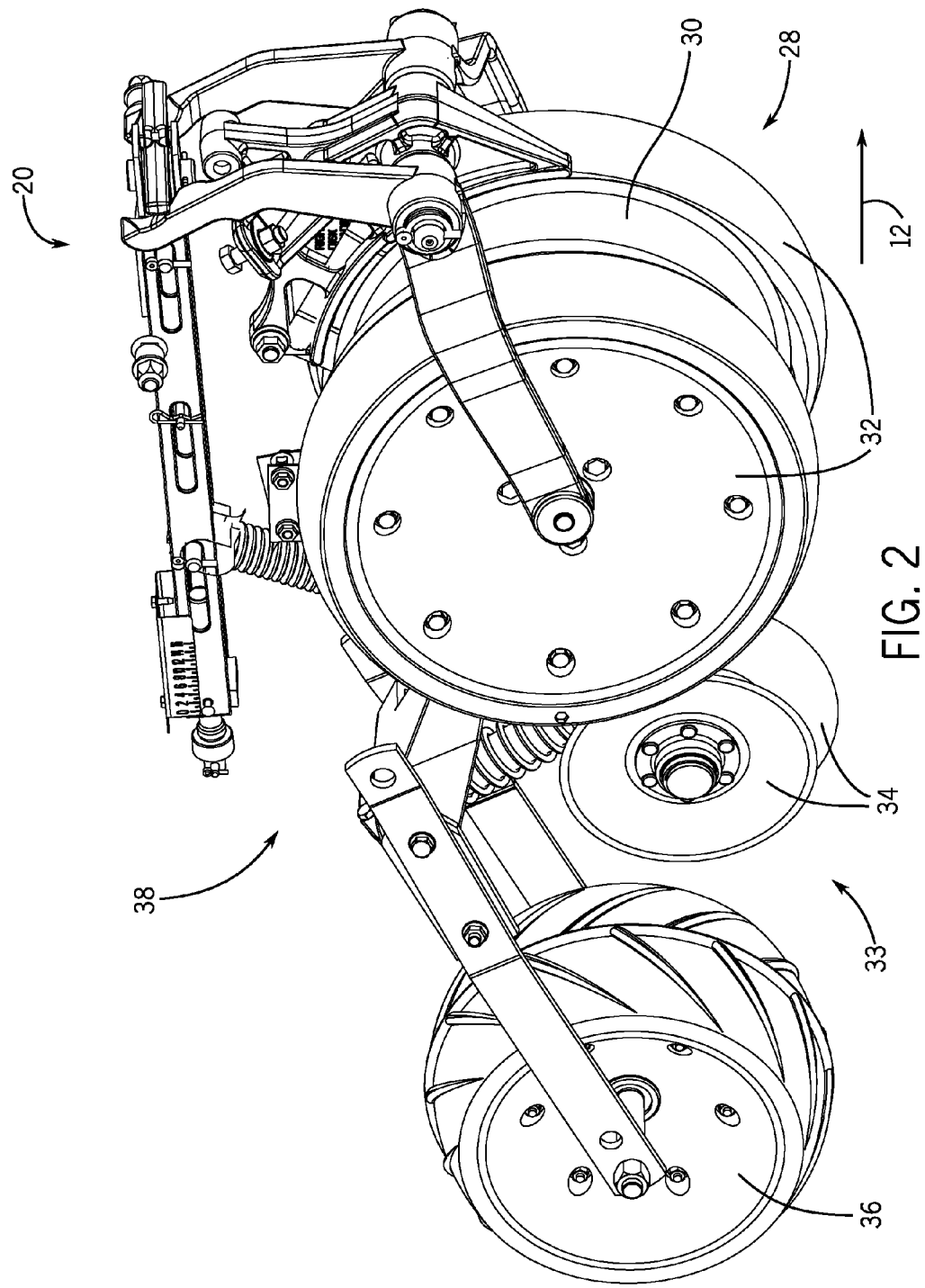
FIG. 2 is a perspective view of an embodiment of a row unit having an opener assembly with gauge wheels disposed adjacent to opener discs.

FIG. 2 is a perspective view of an embodiment of the row unit 20 having an opener assembly with gauge wheels disposed adjacent to opener discs. The row unit 20 includes multiple components that facilitate planting operations. Specifically, the row unit 20 includes an opener assembly 28 having a pair of opener discs 30 that rotate into soil as the row unit 20 travels across a field to form furrows for planting seeds. A set of gauge wheels 32 may be used to set a depth that the opener discs 30 extend into the soil. The depth set by the gauge wheels 32 may be selected by an operator, such that the furrow depth resulting from rotation of the opener discs 30 is adjustable. For example, certain seeds may be planted deep into soil to facilitate optimal plant growth, thereby using a deep furrow. Conversely, other seeds may be planted shallow into soil to facilitate optimal plant growth, thereby using a shallow furrow.

Once the seeds are deposited in the furrow, a closing assembly 33 may redirect the removed soil back into the furrow to cover the seeds. As illustrated, the closing assembly 33 includes closing discs 34 disposed rearwardly from the gauge wheels 32 relative to the direction of travel 12. The closing discs 34 are positioned to direct soil back into the furrow to cover the seeds. Furthermore, a packing wheel 36 may follow the closing discs 34 to compact the soil onto the seeds.

In certain embodiments, portions of the opener discs 30 may be in physical contact with the gauge wheels 32. Accordingly, the gauge wheels 32 may scrape soil off the opener discs 30 to reduce soil build-up and/or to enable the furrow to be consistently formed. The opener discs 30, the gauge wheels 32, the closing discs 34, and the packing wheel 36 are coupled to a frame assembly 38 of the row unit 20.

Figure 3:
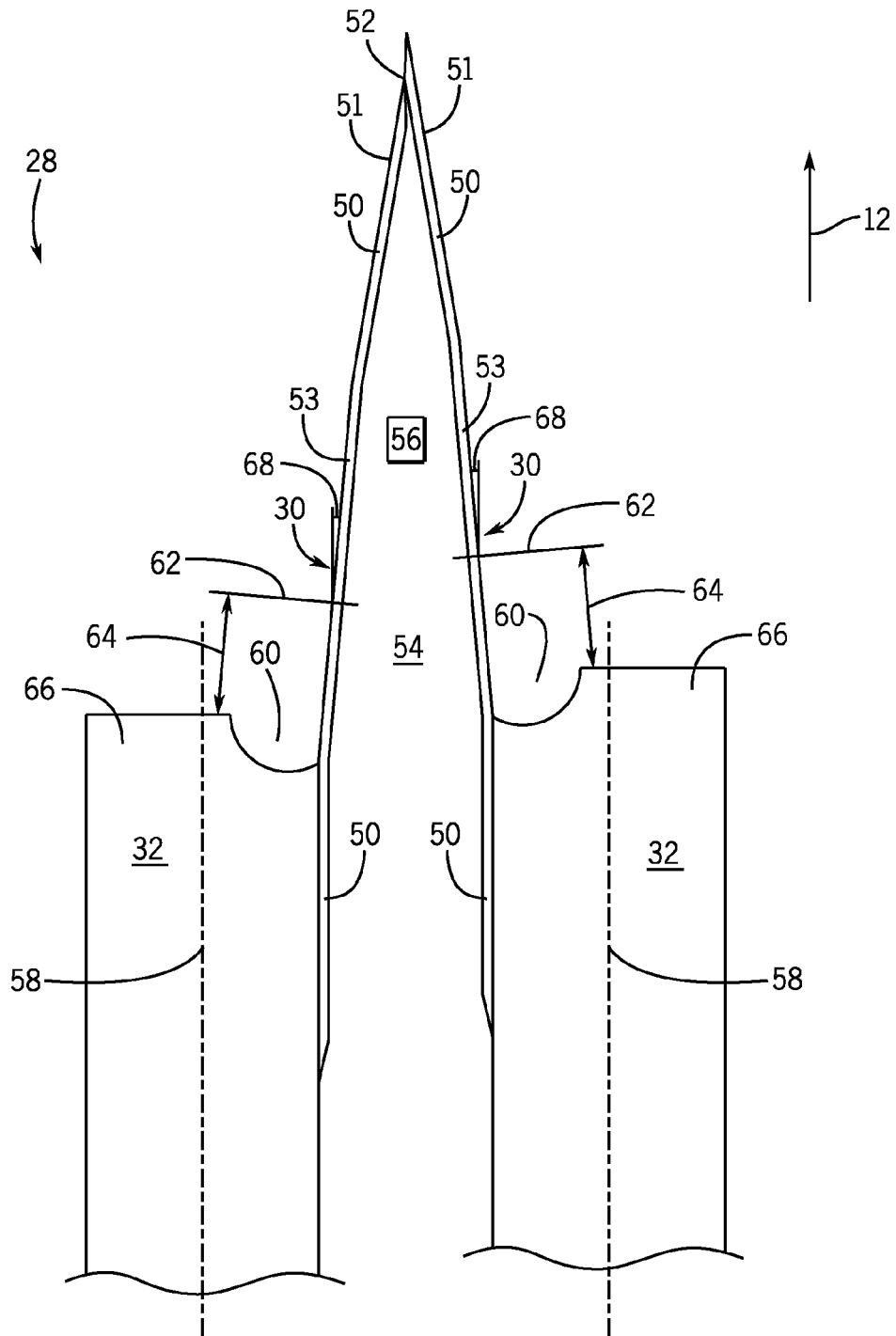
FIG. 3 is a cross-sectional view of an embodiment of an opener assembly of a row unit having gauge wheels that extend substantially parallel to a direction of travel of the row unit.

FIG. 3 is a cross-sectional view of an embodiment of the opener assembly 28 of the row unit 20 having the gauge wheels 32 extending substantially parallel to the direction of travel 12 of the row unit 20. As illustrated, the opener discs 30 extend forward of the gauge wheels 32 with respect to the direction of travel 12. Furthermore, the opener discs 30 include angled portions 50 around their periphery. At a first end 51 of the opener discs 30, the angled portions 50 intersect to form a pinch point 52 having a v-shape. In certain embodiments, the pinch point 52 enters the soil to form the furrow. In other embodiments, the pinch point 52 is located above the soil. The angled portions 50 extend outwardly from a central portion 53 of the opener discs 30. In some embodiments, the opener discs 30 have a concave shape, thereby forming the angled portions 50 and the central portion 53. A gap 54 is formed between the opener discs 30, which is based on a shape of the opener discs 30. The gap 54 may be sufficiently wide to facilitate placement of a seed tube 56 therein. In certain embodiments, the gap 54 may include an electronic seed sensor configured to provide notifications regarding the seed flow into the furrow. Furthermore, in some embodiments, the gap 54 may accommodate fertilizer and/or insecticide insertion devices.

As illustrated, the gauge wheels 32 extend along a plane 58 aligned with (e.g., substantially parallel to) the direction of travel 12. For example, in certain embodiments, the gauge wheels 32 may be within approximately 0 to 1, or 1 to 3 degrees of being parallel to the direction of travel 12. Accordingly, a draft load produced by the gauge wheels 32 may be substantially reduced, as compared to opener assemblies that have gauge wheels 32 that are not substantially parallel to the direction of travel 12. Furthermore, the parallel arrangement of the gauge wheels 32 may reduce the distance that soil is thrown from the furrow by the opener discs 30. Therefore, soil excavated from the furrow by the opener discs 30 may be redeposited into the furrow by the row unit 20. Accordingly, the agricultural implement 10 may operate at high speeds without throwing soil beyond a location where the row unit 20 may capture the soil (e.g., via the gauge wheels 32 and/or the closing assembly 33). As illustrated, the gauge wheels 32 include an indention 60 along their inner diameter to facilitate directing soil removed from the furrow back into the furrow. In other embodiments, the gauge wheels 32 may include a feature different than the indention 60, and/or may not include any feature in place of the indention 60. It may be appreciated that the gauge wheels 32 may be cambered to enable an inner side of the gauge wheels 32 to contact the opener discs 30. For example, in certain embodiments, the gauge wheels 32 may contact the opener discs 30 approximately 0 to 10 centimeters (cm) vertically above a bottom end of the opener discs 30. Accordingly, the gauge wheels 32 may block soil from adhering to the opener discs 30, such as while operating the gauge wheels 32 in moist soil.

Each opener disc 30 has a centerline 62. A distance 64 separates a front end 66 of a respective gauge wheel 32 and the centerline 62. In certain embodiments, the distance 64 may be within a range of approximately 3 to 10 cm, 5 to 12 cm, or 8 to 15 cm. Moreover, in other embodiments, the distance 64 may be within a range of approximately 5 to 20%, 10 to 25%, or 15 to 35% of a diameter of the opener disc 30. As illustrated, an angle 68 between the direction of travel 12 and the opener disc 30 at the centerline 62 may be approximately 0 to 20 degrees. The seed tube 56 may be positioned forward of the centerline 62, relative to the direction of travel 12. Furthermore, in certain embodiments, the opener discs 30 may include a device coupled between the opener discs 30. In such embodiments, the seed tube 56 may be positioned forward of any such device, relative to the direction of travel 12.

Figure 4:
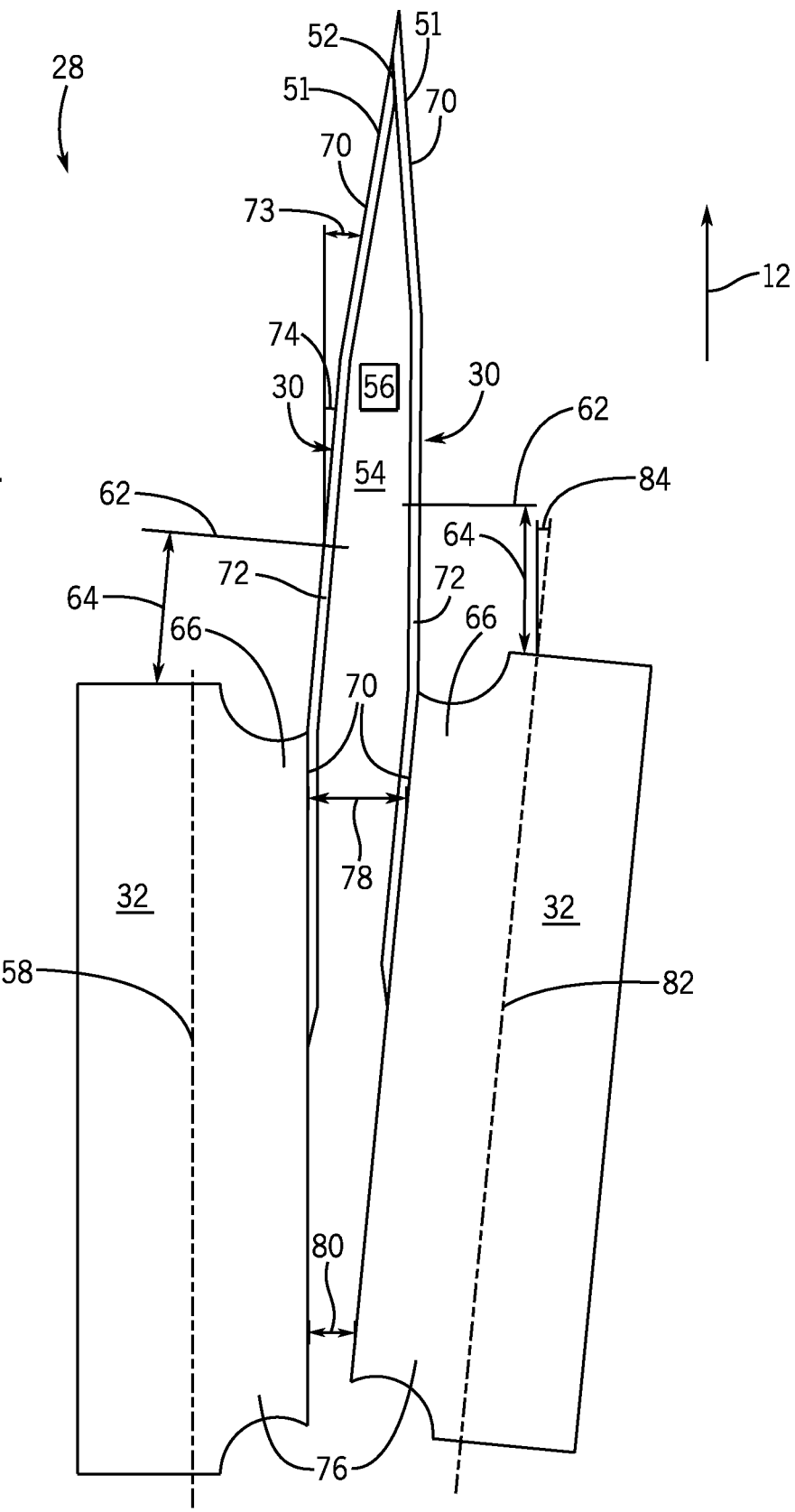
FIG. 4 is a cross-sectional view of an embodiment of an opener assembly of a row unit having gauge wheels disposed behind a central portion of opener discs of the opener assembly.

FIG. 4 is a cross-sectional view of an embodiment of the opener assembly 28 of the row unit 20 having the gauge wheels 32 disposed behind a central portion of the opener discs 30 of the opener assembly 28. As illustrated, the opener discs 30 include a peripheral portion 70 that extends around a central portion 72 of the opener discs 30. The peripheral portion 70 is angled away from the central portion 72 such that the opener discs 30 have a concave shape. Moreover, an angle 73 of the peripheral portion 70 relative to the direction of travel 12 may be different than an angle 74 of the central portion 72 relative to the direction of travel 12. The two adjacent opener discs 30 form the gap 54 for the seed tube and/or other components. The opener discs 30 are disposed between the gauge wheels 32, such that the opener discs 30 extend forward of the gauge wheels 32. Moreover, the gauge wheels 32 are disposed adjacent to the peripheral portion 70 of a rearward end of the opener discs 30 relative to the direction of travel 12. Furthermore, the opener discs 30 may be tilted inward at the front end 51 to create the pinch point 52.

The gauge wheels 32 are generally aligned with the rearward end of the opener discs 30. Accordingly, the front end 66 of the gauge wheels 32 may physical contact the peripheral portion 70 of the opener discs 30 to facilitate cleaning the opener discs 30. Furthermore, the gauge wheels 32 may be toed toward one another at a rear end 76. Therefore, a distance 78 between the front ends 66 of the gauge wheels 32 is greater than a distance 80 between the rear ends 76 of the gauge wheels 32. As may be appreciated, the convergence of the gauge wheels 32 at the rear end may facilitate recovery of a larger amount of the removed soil, thereby directing the soil into the furrow and obviating the use of closing discs. The packing wheel 36 may directly follow the gauge wheels 32 to compact the soil over deposited seeds. As illustrated, the gauge wheels 32 extend along separate planes 58 and 82. In certain embodiments, one of the gauge wheels 32 may be aligned with (e.g., substantially parallel to) the direction of travel 12. For example, the plane 58 may be aligned with the direction of travel 12. Furthermore, the plane 82 may be offset from the direction of travel 12 by an angle 84. In some embodiments, the angle 84 may be within a range of approximately 0 to 10 degrees. It may be appreciated that the gauge wheels 32 may be cambered to enable an inner side of the gauge wheels 32 to contact the opener discs 30. For example, in certain embodiments, the gauge wheels 32 may contact the opener discs 30 approximately 0 to 10 centimeters (cm) vertically above a bottom end of the opener discs 30. Accordingly, the gauge wheels 32 may block soil from adhering to the opener discs 30, such as while operating the gauge wheels 32 in moist soil. Moreover, the seed tube 56 may be positioned forward of the centerline 62, relative to the direction of travel 12. Furthermore, in certain embodiments, the opener discs 30 may include a device coupled between the opener discs 30. In such embodiments, the seed tube 56 may be positioned forward of any such device, relative to the direction of travel 12.

As discussed herein, the gauge wheels 32 may be positioned adjacent to the opener discs 30 such that the gauge wheels 32 are substantially parallel to the direction of travel 12 of the row units 20. Such a position may decrease a draft load caused by the gauge wheels 32 contacting the soil. Moreover, such a position may also direct a substantial amount of soil toward the furrows formed by the opener discs 30, may provide a greater gap between the opener discs 30 for placement of a seed tube, and may facilitate formation of a narrower furrow, as compared to opener assemblies that have gauge wheels that are not substantially parallel to the direction of travel 12. In other embodiments, the gauge wheels 32 may be positioned adjacent to a rear portion of the opener discs relative to the direction of travel 12 of the row units 20. Accordingly, the gauge wheels 32 may function as closing discs and may direct soil into the furrows. In such a row unit 20, closing discs may be obviated, thereby decreasing costs associated with manufacturing the row units 20.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A row unit for an agricultural implement, comprising:
    a ground engaging tool configured to penetrate soil and to form a furrow in the soil, wherein the ground engaging tool comprises two opener discs; and
    a plurality of gauge wheels disposed adjacent to the opener discs of the ground engaging tool and configured to enable the ground engaging tool to penetrate the soil at a selectable penetration depth, wherein each of the plurality of gauge wheels extends substantially parallel to a direction of travel of the row unit, and a substantially flat portion of each of the opener discs is in contact with at least one of the plurality of gauge wheels.

2. The row unit of claim 1, wherein the two opener discs extend toward one another to form a V-shape.

3. The row unit of claim 1, comprising a seed tube disposed between the two opener discs, wherein the seed tube is disposed forward of a centerline of each of the two opener discs relative to the direction of travel, and the seed tube is configured to direct seeds into the furrow.

4. The row unit of claim 1, wherein the plurality of gauge wheels comprises two gauge wheels.

5. The row unit of claim 1, wherein each gauge wheel of the plurality of gauge wheels comprises an indention configured to direct soil into the furrow.

6. The row unit of claim 1, wherein a front end of each gauge wheel of the plurality of gauge wheels is disposed behind a centerline of the ground engaging tool relative to the direction of travel.

* * * * *